(12) United States Patent
Bauchot et al.

(10) Patent No.: US 8,514,886 B2
(45) Date of Patent: Aug. 20, 2013

(54) METHOD AND USER DEVICE FOR RECEIVING DIGITAL TRANSMISSIONS

(75) Inventors: Frederic Bauchot, Saint-Jeannet (FR); Francois-Xavier Drouet, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/269,936

(22) Filed: Nov. 13, 2008

(65) Prior Publication Data

US 2009/0135898 A1 May 28, 2009

(30) Foreign Application Priority Data

Nov. 23, 2007 (EP) ..................................... 07301577

(51) Int. Cl.
*H04J 3/24* (2006.01)
(52) U.S. Cl.
USPC ........................................... 370/473; 370/232
(58) Field of Classification Search
USPC ..................... 370/232, 240.01, 473
See application file for complete search history.

(56) References Cited

U.S. PATENT DOCUMENTS

| | | | |
|---|---|---|---|
| 5,892,894 A | 4/1999 | Shiroshita et al. | |
| 7,177,266 B2 | 2/2007 | Sudo | |
| 7,227,868 B2 | 6/2007 | Inden | |
| 7,882,419 B2 | 2/2011 | Takakuwa | |
| 8,145,969 B2 | 3/2012 | Bauchot et al. | |
| 2004/0160979 A1* | 8/2004 | Pepin et al. | 370/462 |
| 2005/0246417 A1 | 11/2005 | Raith | |
| 2006/0268918 A1 | 11/2006 | Olexa et al. | |
| 2007/0038922 A1 | 2/2007 | Kim et al. | |
| 2007/0053303 A1* | 3/2007 | Kryuchkov | 370/250 |
| 2007/0171855 A1 | 7/2007 | Yoneta | |
| 2007/0223535 A1* | 9/2007 | Hamazaki | 370/486 |
| 2009/0138932 A1 | 5/2009 | Bauchot et al. | |

FOREIGN PATENT DOCUMENTS

| | | |
|---|---|---|
| EP | 1385292 A2 | 1/2004 |
| WO | 2006031562 A2 | 3/2006 |
| WO | 2006105010 A2 | 10/2006 |

OTHER PUBLICATIONS

Iqbal, U.S. Appl. No. 12/269,125 Notice of Allowance, FR920070092US1, Dec. 1, 2011, 15 pages.
Lu et al., "Video Streaming Over 802.11 WLAN With Content-Aware Adaptive Retry", Department of Electrical and Computer Engineering, Carnegie Mellon University, 2005 IEEE, 4 pages.
Wang et al., "Rate-Sensitive ARQ for Real-Time Video Streaming", Globecom 2003, IEEE, pp. 3361-3365.

\* cited by examiner

*Primary Examiner* — Mark Rinehart
*Assistant Examiner* — Matthew Hopkins
(74) *Attorney, Agent, or Firm* — Douglas A. Lashmit; Hoffman Warnick LLC

(57) ABSTRACT

The invention provides a user device (3) connected to a source unit (2) through a communication network for receiving digital transmissions in the form of bursts from a source unit. The user device comprises a receiver (300) for receiving bursts from the source unit, and a rendering unit (36) for rendering the digital broadcast transmission based on the received bursts. The user device further includes:

a buffer (320) for buffering for each received burst for a predefined buffer duration, the user device being provided to transmit the buffered bursts to the rendering unit in response to expiry of the predefined buffer duration, and a quality analyzer (37) for evaluating a quality indicator related to the quality of the burst, checking whether the quality indicator matches a quality condition related to a predefined quality threshold, and in response to the quality indicator of the received burst not matching the quality condition, requesting retransmission of the burst, the quality analyzer (37) being arranged to operate within the predefined buffer duration.

25 Claims, 10 Drawing Sheets

METHOD AND USER DEVICE FOR RECEIVING DIGITAL TRANSMISSIONS

FIELD OF THE INVENTION

The invention relates generally to a method and a user device for use in a digital content delivery system.

BACKGROUND ART

In digital content delivery systems, multimedia content is broadcasted to user devices by a broadcasting unit through communication channels.

During transmission of the signals from the broadcasting unit to the end user devices, errors might appear in the multimedia content, due to bad conditions in the transmission channels, and consequently the user might receive corrupted content.

Conventional systems are known to detect and/or correct radio transmission errors, such as Forward Error Correcting (FEC) systems. These systems are implemented on the user devices. Such systems are based on a modification of the very multimedia content by adding redundancy to the original information bits. With FEC codes, a user device can directly correct transmission errors. However, the redundant bits added to original information bits reduce the gross bit rate of transmission. Further, FEC systems only allow corrections of errors due to a limited number of reasons such as noise or interference. Therefore, data might be received with insufficient quality.

Other solutions are known that allow retransmission of data that has not been received in the original transmission either through the broadcasting channels or through a dedicated point-to-point channel. The user device reports any missing data to the broadcasting unit, and the broadcasting unit accordingly retransmits the missing data to the user device. Such solutions ensure that all the data will be received by the user devices. However, they require a huge amount of bandwidth for retransmitting simultaneously the data to all the end users.

SUMMARY OF THE INVENTION

The present invention ensures that all the data contained in the digital content will be received with a satisfying level of quality, with no need to apply complex error correction algorithms at the user device level. Accordingly, the quality of the video content is significantly increased.

With the invention, the received data are buffered for a predefined time duration prior to rendering, so that detection of corrupted data at the user device level and retransmission of the corrupted data may be performed within the buffering duration.

According to an aspect of the invention, the received data is duplicated prior to buffering, which allows submission of the duplicated data to a quality analyzer for quality evaluation during the buffering duration. The invention accordingly improves quality of the digital content received at the user device, without further delay.

The invention provides detection of corrupted data at the user device level, in a transparent manner for the player, and allows selection of corrupted data as candidate for retransmission at the quality manager level. As a result, if the quality manager decides not to select corrupted data as candidate for retransmission based on its predefined rules, or if it only selects the corrupted data subsequently after a time period expires, the rendering unit operation will not be delayed.

The quality manager according to the invention can take into account various conditions such as the overall number of data for which retransmission is requested or other transmission conditions, such as the available bandwidth, for selecting candidates for retransmission.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

Figure 1:
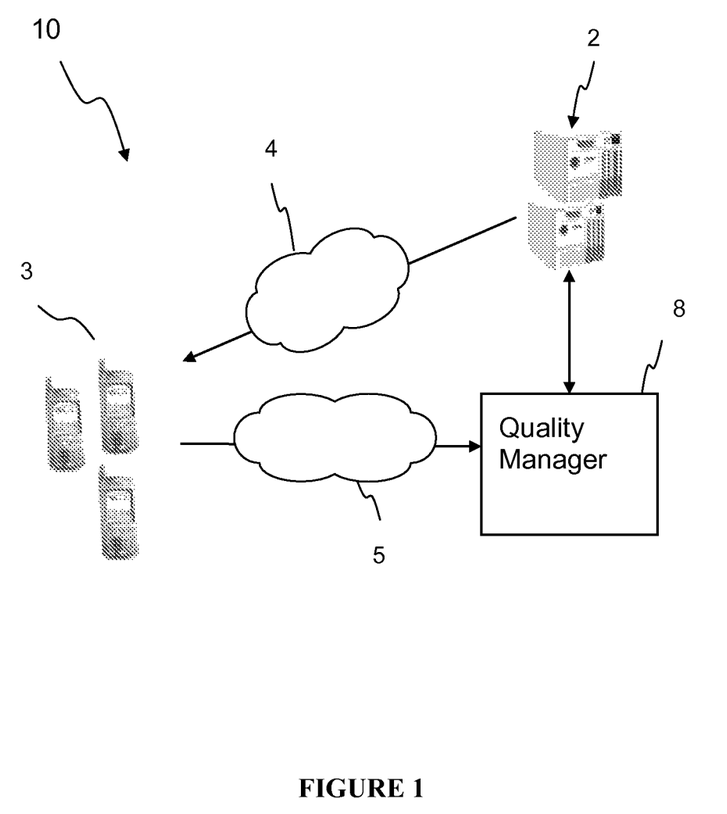
FIG. 1 illustrates the overall structure of a broadcasting system according to an embodiment of the invention.

FIG. 1 shows an overall view of a system 10 for delivering digital content to user devices 3, and in particular video content, according to the invention. The following description will be made with reference to video content, for illustrative purposes only. However, it will be understood by those of ordinary skill in the art that that digital content may encompass other type of content such as audio or text content.

The system 10 includes a source unit 2 connected through a communication network 4 to one or more user devices 3. The communication network 4 may be a broadcasting network or a multicast network. Such a network allows a point-to-multipoint (PTM) communication where data packets are simultaneously transmitted from the source unit 2 to multiple user devices 3. On the broadcasting embodiment of the invention, the source unit 2 is arranged to deliver digital content to the user devices 3 that are connected to the broadcasting network 4, for example over the air (either terrestrial or via satellite). In the multicast embodiment of the invention, services are only delivered to the user devices 3 that have joined a particular multicast group, interested in a certain kind of content. The following description will be made with reference to a broadcasting network 4, and a broadcasting source unit 2, also referred to thereinafter as "broadcasting unit", although the skill person will readily understood that the invention also applies to a multicast network.

The broadcasting unit 2 is connected to content providers that provide their actual digital content. The content providers may include for instance television and/or digital television service providers.

The user devices 3 may be any network-enabled device, and in particular any network-enabled mobile device, such as a personal digital assistant (PDA), a cellular telephone, a mobile terminal, a personal video recorder, a portable television, a personal computer, a digital camera, etc.

Although the invention has particular advantages for such user devices, the skilled person will readily recognize that any type of user device suitable for the reception of the broadcasted digital content could be used alternatively. The description thereinafter will be made with reference to a user device of the type mobile phone, for illustrative purposes only.

Each user device 3 is provided to receive digital content broadcasted from the broadcasting unit 2 through the communication network 4.

The system 10 further includes a quality manager 8 connected to all the user devices 3 in the communication network 4 through a second communication network 5. The second communication network 5 may comprise, for example, a point to point communication network such as a 2G (second generation) or 3G (third generation) cellular networks. The quality manager 8 manages retransmission of data which have been received from user devices 3 and for which poor quality has been detected. The quality manager 8 is accordingly arranged to send retransmission requests to the broadcasting unit 2 identifying corrupted data and the associated user devices 3. The broadcasting unit 2 will in turn resend the requested data to the associated user device. In the present description, the term "corrupted" should be understood as designating data having an insufficient quality level with regards to a quality threshold.

Figure 2:
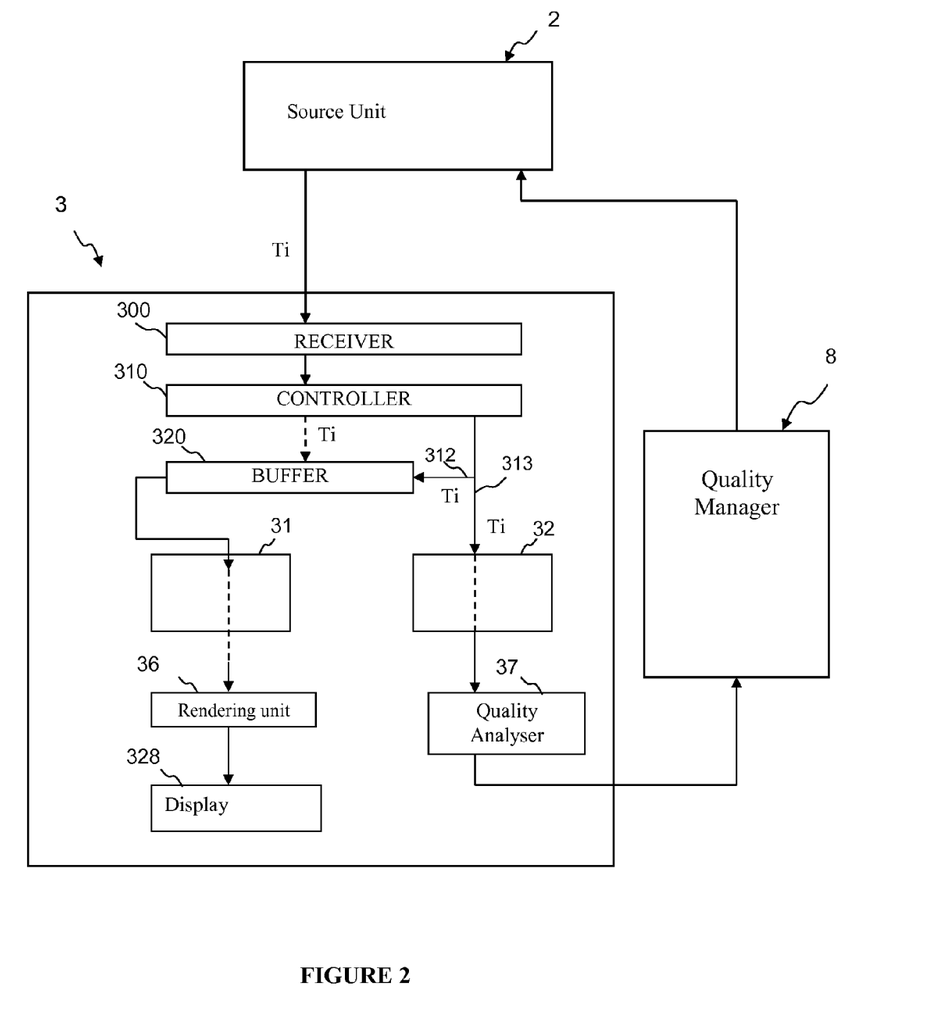
FIG. 2 is a diagram showing the structure of the system according to the invention.

FIG. 2 shows the detailed structure of the system 10 according to the invention. FIG. 2 only shows one user device 3 for more clarity.

Each user device 3 comprises a receiver 300 for receiving video content from the broadcasting unit 2 in the form of discontinuous bursts of content Ti, a controller 310 for determining whether the burst Ti is a retransmission of a previously received burst, and a buffer 320 for storing received bursts for a predefined buffer duration. The bursts will be referred to thereinafter as "video containers".

If the controller 310 determines that the current video container Ti is not a retransmission of a previously received video container, then it duplicates video container Ti, pushes Ti in buffer 320 (arrow 312), and transmits the duplication of video container Ti to a quality analyzer 37, through a processing unit 32 which decodes the video container.

The quality analyzer 37 is provided to evaluate the quality level in the video container Ti. If the quality analyzer 37 detects that the quality level in the video container is not satisfying, it notifies the corrupted video container Ti to the quality manager 8.

To detect whether the quality level in the video container is satisfying or not, the quality analyzer 37 may determine whether a quality indicator related to the quality of the video container matches a quality condition. For example, the quality of the video container will be determined as insufficient, if the quality indicator is lower than a predefined quality threshold.

Accordingly, the quality analyzer 37 may be adapted to evaluate a quality indicator for the current video container Ti and to determine whether the quality indicator is lower than the predefined quality threshold. The quality indicator may be a parameter related to subjective video quality representing how a video sequence is perceived by the end user, such as the Mean Opinion Score (MOS) parameter which provides a numerical indication of the perceived quality of received media after compression and/or transmission, or the Quality of Experience (QoE) parameter.

If it is determined that the quality indicator is lower than the quality threshold, information related to the corrupted burst Tk is then sent to the quality manager 8.

The video container Ti is thus buffered at the user device for the predefined buffer duration (arrow 312), whether or not an insufficient quality level is detected for a given video container, If an insufficient quality level is detected in the current video container Ti, the user device 3 will notify the corrupted video container to the quality manager 8. If the quality level is sufficient, no notification is sent to the quality manager 8 and the video container remains in buffer 320 until expiry of the buffering duration.

The quality manager 8 is connected to the user devices 3 in the broadcasting network so that it may receive notifications identifying corrupted video containers therefrom. The quality manager 8 comprises at least one management table 80 thereinafter called "container table" for maintaining information concerning the corrupted video containers detected by the user devices 3.

Periodically, or in response to a triggering event, the quality manager 8 will select a number of corrupted video containers from the container table, based on predefined rules. The quality manger 8 will then transmit information identifying the selected corrupted video containers to the broadcasting unit 2 for retransmission.

The controller 310 further determines whether a received video container Ti is a retransmitted video container or not. The controller 310 will simply replace the previously received video container with the retransmitted one in buffer 320, as shown by arrow 311, with no subsequent analysis of the video container quality by quality analyzer 37.

Once the buffer duration elapses, the video containers are retrieved from the buffer 320 out of order and transmitted to a rendering unit 36, for example a player, through a processing unit 31. The rendering unit 36 processes the video containers and provides the proper instructions to the display 38 for displaying the video.

The broadcasting unit 2 may use an IP datacasting (IPDC) network 4 to broadcast digital content. IPDC is a combination of digital broadcast and Internet Protocol. Through such an IP-based broadcasting network 4, the broadcasting unit 2 can supply different types of video streams and in particular Digital Video Broadcasting (DVB) streams. One type of DVB is Digital video broadcasting-handheld (DVB-H), a recently developed technology that increases the capabilities and services available on small handheld user devices 3, such as mobile telephones.

According to the Digital Video Broadcast-Handheld (DVB-H) standard, the broadcasting unit 2 is provided to broadcast the digital content in the form of discontinuous bursts, also called "time-sliced" bursts. Between bursts, the receiver of the user device 3 can be shut down resulting in considerable power savings, and accordingly longer battery lifetime for the user device 3. "Time slicing" technology is employed to reduce power consumption for small handheld terminals. Time-slicing means that the digital content is delivered to the handheld device 3 in bursts at given intervals of time. When the user device receiver 300 is not receiving the wanted burst of data, the tuner contained in the handheld device is "inactive" and therefore using less power.

The following description will be made with reference to DVB-H technology for illustrative purposes only. However, the invention is not limited to a DVB-H application and may involve other digital broadcasting technologies.

Figure 3:
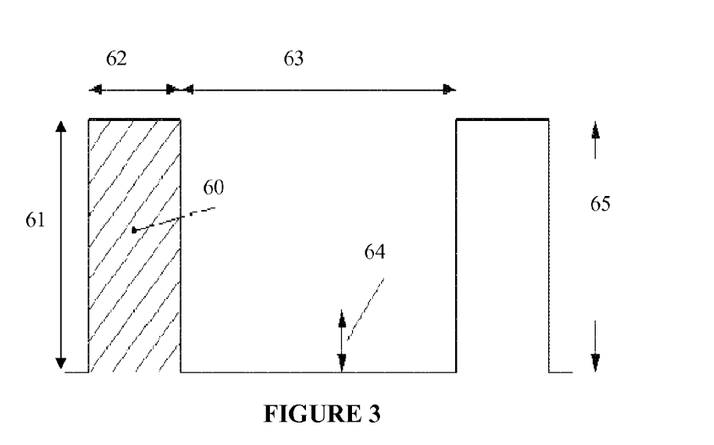
FIG. 3 is a table illustrating the structure of a MPE-FEC frame.

FIG. 3 illustrates a time-slice structure according to DVB-H technology. As shown, time slices 60 are bursts or video containers where the relevant data are transmitted. DVB-H provides a channel with a constant, maximum bandwidth, for all video streams and data. The different video streams of an initial video sequence are somewhat radiated, each video stream having a nominal bandwidth. The user device receiver 300 (DVB-H receiver) is switched when the data are not available. The user device receiver 300 is woken up when the next burst is expected.

A time-sliced elementary stream has the following features:

the burst size 61 representing the bitrate used by a time-sliced elementary stream when transmitting a burst;

the burst duration 62 representing the time from the beginning to the end of a burst;

the off-time 63 representing the time between bursts. During off-time, no transport packets are delivered on the relevant elementary stream;

the constant bit rate 64 representing the average bit rate required by the elementary stream when not time-sliced; and the burst bit rate 65 representing the bit rate used by the time-sliced elementary stream when transmitting a burst.

Figure 4:
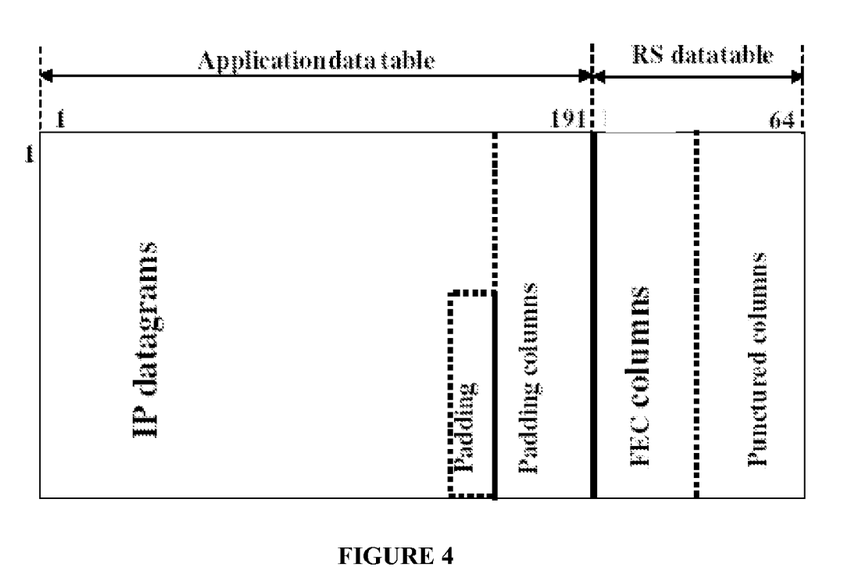
FIG. 4 is a functional diagram showing the different elements involved in a digital transmission according to a DVB-H embodiment of the invention.
Figure 5:
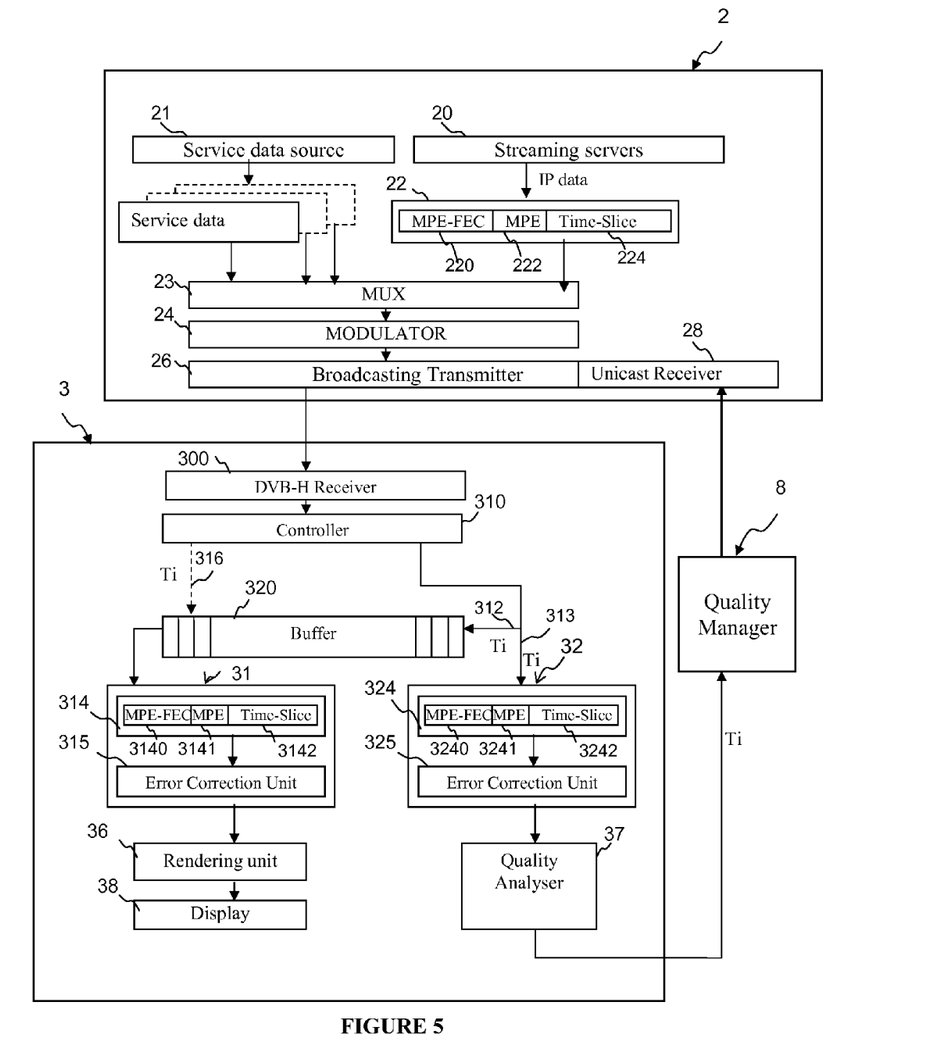
FIG. 5 is a diagram showing the structure of the system according to the DVB-H embodiment of the invention.

DVB-H may also provide improved transmission robustness through the use of an additional level of forward error correction (FEC) at the Multi Protocol Encapsulation (MPE) layer. MPE-FEC adds redundancy to the data. An MPE-FEC frame is arranged as a matrix with 255 columns and a flexible number of rows as shown in FIG. 4. The number of rows may vary from 1 to 1024. The protection is ensured by the Reed-Solomon code used for the MPE-FEC block. The code takes 191 bytes, adds 64 parity bytes of redundancy, and by using the cyclic redundancy check (CRC) in the MPE-FEC packet header, it flags the MPE-FEC packet contents as unreliable if the CRC check fails. If the MPE-FEC packet contents are unreliable, the bytes in the packet are termed "erasure" symbols, and using erasures allows the decoder to correct twice the number of bytes that could be corrected if erasures were not used. The left part of the MPE-FEC frame, consisting of the 191 leftmost columns, is dedicated to IP datagrams and possible padding. The right part of the MPE-FEC frame, consisting of the 64 rightmost columns, is dedicated to the parity information of the FEC code. An MPE-FEC frame is divided into sections so that an IP datagram forms the payload of an MPE-section and a redundancy column form the payload of a FEC-section. FIG. 5 shows a detailed structure of system 10, according to the DVB-H embodiment of the invention. In FIG. 5, same reference numerals as in FIG. 2 are used to designate similar elements. Further, FIG. 5 only shows a unique user device 3 for more clarity.

In the broadcast head-end side, the broadcasting unit 2 includes one or more multimedia streaming servers 20 for delivering digital content to user devices 3 in the communication network 4 through a streaming protocol, such as RTP, and a source 21 for other IP data, containing e.g., ESG (electronic service guide) data or MP4 files with media data, delivered with a file delivery protocol, such as file delivery over unicast transport (FLUTE).

The Real-time Transport Protocol (RTP) may be used for streaming data from the streaming server 20, where audio, video and subtitling are delivered in real time. The FLUTE (file delivery over unicast transport) protocol may be used for service data from source 21, and for retransmitted corrupted video containers. "FLUTE" protocol (file delivery over unicast transport) employs the user datagram protocol (UDP) as its underlying transport protocol.

The multimedia streaming servers 20 more specifically provide the digital content in the form of IP (Internet Protocol) multicast streams containing digital content such as audio, video, and/or text.

The broadcasting unit 2 further includes a DVB-H encapsulator 22, a multiplexer 23, a modulator 24 and a transmitter 26. The streaming servers 20 send one IP multicast stream to the DVB-H encapsulator 22 for encapsulation.

The DVB-H encapsulator 22 captures the IP multicast packets sent by the streaming servers 20 and then encapsulates them in a DVB transport stream TS. The DVB-H encapsulator 22 provides means to generate a MPE block 220, a MPE-FEC block 222 and a time slicing block 224.

The multiplexer 23 may comprise suitable logic circuitry for multiplexing IP encapsulated DVB-H data from encapsulator 22 and the service data from the source 21. The multiplexer 23 combines transport streams from one or more different sources 20 and 21. The resulting stream is sent to the modulator 24, which converts the transport stream from a digital representation into a radio frequency (RF) signal before transmission to the user device 3 through the transmitter 26. The transmitter 26 amplifies the RF signal and broadcasts the signal to the user devices 3.

As a result, digital content such as a streaming video program can be transmitted to the user device 3 during time slots, i.e., by fragmenting the digital content into bursts or video containers which occur in particular portions of time slots (or "time slices"). Each burst has a fixed duration and consecutive bursts are separated in time by a time interval.

Each user device 3 is connected to the broadcasting unit 2 through a wireless or a wired communication network 4. An Example of a wired communication network may be based for instance on GPRS/EDGE/UMTDS.

The communication network 4 may be an IP network which provides a communication service using an Internet protocol, and can provide an IPv6 network service. Through the IP network 4, a transport stream from the DVB-H broadcasting unit 2 is provided to the user device 3. The user device 3 can access the IP network 4 by using an IP network service, particularly, an IPv6 network service, and receive the DVB-H transport stream TS from broadcasting unit 2 through access to the IP network 4.

The user device 3 is configured to receive, decode and process transmissions. The user device 3 may include a receiving antenna to receive wireless transmissions. In addition, the user device 3 includes the receiver 300, the controller 310, the buffer 320, the processor 32, the rendering unit 36 connected to a display 38, and the video analyzer 37 connected to a quality manager 8, as described above with reference to FIG. 2. The skilled person will readily understood that the user device 3 may include other components not shown, such as a battery, a speaker, one or more antennas, a housing, a user interface, etc.

The receiver 300 is configured to receive DVB-H formatted transmission signals corresponding to a TV slot delivered by the streaming server 20 through a streaming protocol such as RTP, as well as datacast slot delivered by source 21 where various asynchronous data may be sent using a File delivery protocol such as Flute.

The receiver 300 receives and demodulates the inbound signal, and creates a video container in the form of a transport stream to make the signal available for processing.

The received video container is then pushed in buffer 320 for the predefined buffering duration. The buffering duration may take into account the time required by the quality manager 8 to receive notification from the user device, to select a set of video container and to request retransmission to the broadcasting unit 2 of the selected video containers. Alternatively, buffer 320 may be a shift register.

Prior to buffering the transport stream Ti, the user device 3 duplicates the transport stream and transmits the copy of the transport stream to the quality analyzer 37 for quality analysis through a processing unit 32.

The processing unit 32 includes a decapsulator 324 for decapsulating the copy of the transport stream packet and reforming sections. The sections are decapsulated into the MPE-FEC frame. The decapsulator 320 more specifically includes a MPE block 3240 and a MPE-FEC block 3241 for decoding the inbound information into multiprotocol encapsulation forward error correction (MPE-FEC) sections along with erasure information, and parsing through the MPE-FEC sections to extract IP datagrams. A time-slicing block 3242 may further extract from the demodulated RF signal start and end instants of received data bursts for synchronizing the processing of the MPE-FEC sections by MPE-FEC block 3241. The time-slicing block 3242 may mute the receiver 300 for example between each two consecutive transmission data bursts.

The processing unit 32 may further include an error correction unit 325 for correcting specific error in the video container, such as an MPE-FEC decoder that receives the MPE-FEC sections from decapsulator 324 and apply an error correcting code such as the Reed-Solomon code to correct the IP datagrams extracted by the decapsulator 324. The Reed-Solomon Code is only provide to correct specific errors that occur during transmission or storage for a limited number of reasons (for example noise or interference, etc). It does not allow correction of errors due to video quality and in particular subjective video quality as perceived by the end user.

The quality analyzer 37 is adapted to evaluate the quality indicator for the IP datagrams obtained from the decapsulation of the current transport stream Ti and to determine whether the quality indicator is lower than the predefined quality threshold. The quality analyzer 37 may comprise a quality analyzer buffer for buffering each received video container prior to analyzing quality of the video containers.

If the quality indicator is lower than the quality threshold, information related to the corrupted transport stream Ti is sent to the quality manager 8 to notify the corruption.

When the buffer duration elapses, the user device 3 retrieves the bursts out of order from buffer 320. More specifically, the user device 3 retrieves the video container from the buffer 320, out of order, and transmits each video container thus retrieved to another processing unit 31. The processing unit 31 may have a structure similar to the processing unit 32, with an IP decapsulator 314 for extracting the IP datagrams, including a MPE block 3140, a MPE-FEC block 3141, and a time-slicing block 3142, and an error correction unit 315 for error correction, using MPE-FEC decoding.

Then, the IP datagrams corresponding are transmitted to the rendering unit 36, e.g., a video player, which will then render the received datagrams.

Alternatively to processing units 31 and 32, a unique processing unit with a structure similar to the processing units 31 and 32 could be used upstream buffer 320 for decoding and applying error correction to the received video containers prior to duplication. The following description will be made with reference to processing unit 31 and 32 for exemplary purpose.

Prior to buffering the transport stream in buffer 320, the controller 310 checks if the transport stream Ti is a retransmitted stream. This may occur if a notification was previously sent to the quality manager 8, as a result of the detection of an insufficient quality level for the video container Ti, and if the transport stream Ti was selected for retransmission.

If the controller 310 determines that Ti is a retransmitted transport stream, then it simply replaces the previously received stream with the newly received transport stream Ti, with no subsequent duplication and quality analysis At the broadcasting unit level, request for retransmission may be received by a unicast receiver 28, and transport streams for which a retransmission request has been received may be retransmitted using the FLUTE protocol.

Figure 6A:
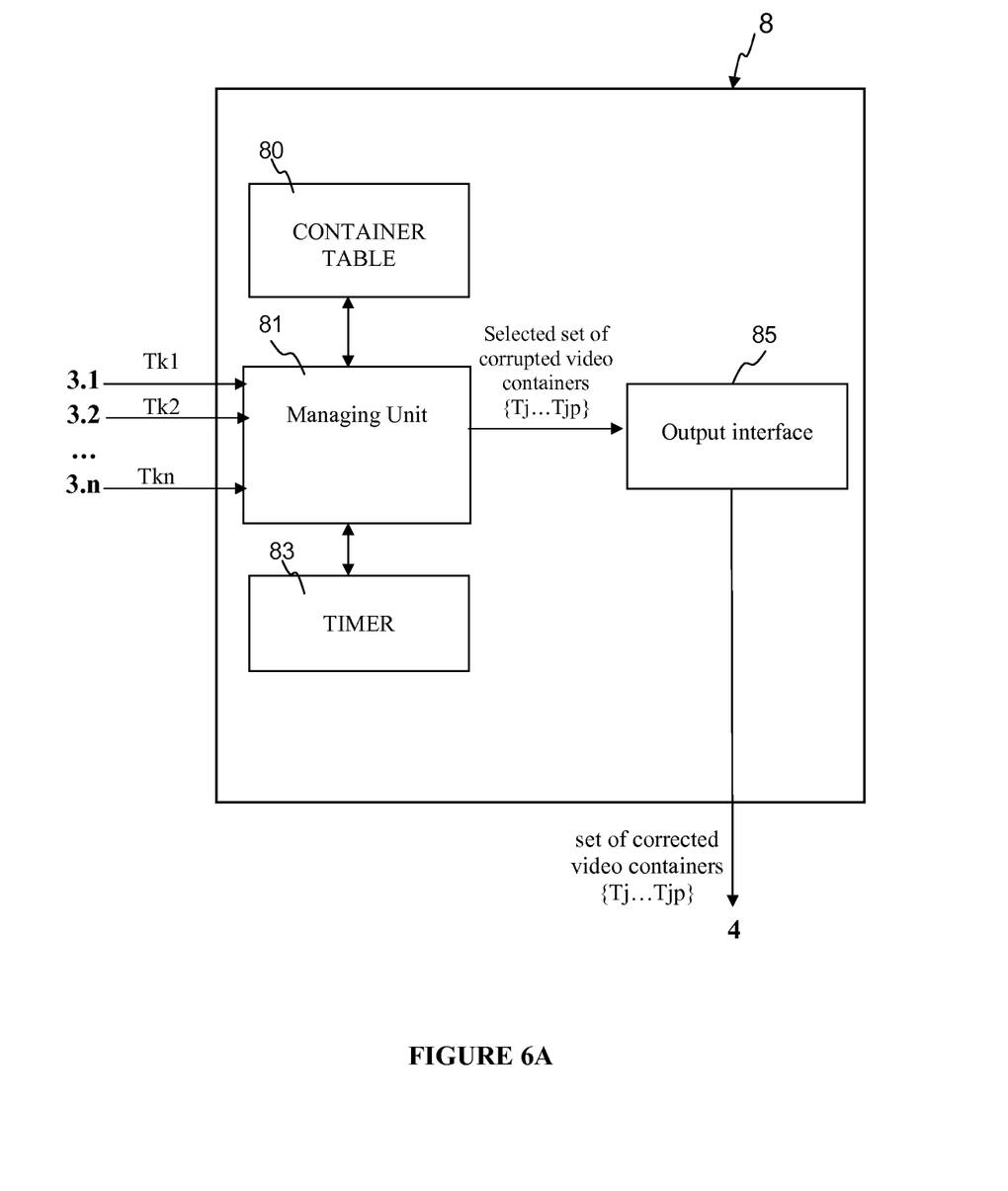
FIG. 6A is a diagram illustrating the structure of the management unit according to the present invention.

FIG. 6A shows the structure of the quality manager 8 according to the invention. The quality manager comprises one or more container tables 80 for storing the information Tk1, TK2, . . . , TKn related to video containers for which a notification has been received from the user devices 3. The following description will be made with reference to a quality manager 8 comprising a unique container table 80, for illustrative purposes only.

The quality manager 8 is communicatively coupled to all the user devices 3.1, 3.2, . . . , 3.$n$ in the network 4. Thereby, it centralizes information related to all the video containers which have been received with insufficient quality in the network, and which accordingly require retransmission.

The quality manager 8 further comprises a managing unit 81 for checking the container table 80, at a predefined time interval monitored by timer 83. The managing unit 81 more specifically selects a set of corrupted video containers from the container table 80 in response to those video containers matching predefined rules. The selected set of video containers is then transmitted to the broadcasting unit 2 through the output interface 85 as candidates for retransmission.

The quality manager 8 can take into account all the notifications received from the user devices in the network, and not solely from a unique user device. Further, the decision as to whether a video container is to be retransmitted or not may depend on a variety of conditions, such as the total number of notifications received by the quality manager 8, broadcasting conditions (available bandwidth), priority conditions (in a pay per view application), level of video container quality, etc.

According to a particular embodiment of the invention, the notification emitted by a user device to the quality manager 8 for a given video container may include information identifying the video container such as a channel identifier CH identifying the transmission channel through which the video container was received by the user device, a sequence number S identifying the video container, and the quality indicator Q evaluated for the video container. The quality manager 8 is arranged to maintain the container table 80 based on these data. More specifically, each entry of the container table 80 may be related to a given video container for which notifications have been received, and may comprise the sequence number S of the video container, in association with the channel identifier identifying the transmission channel of the video container, and a parameter related to the quality indicator Q.

Figure 6B:
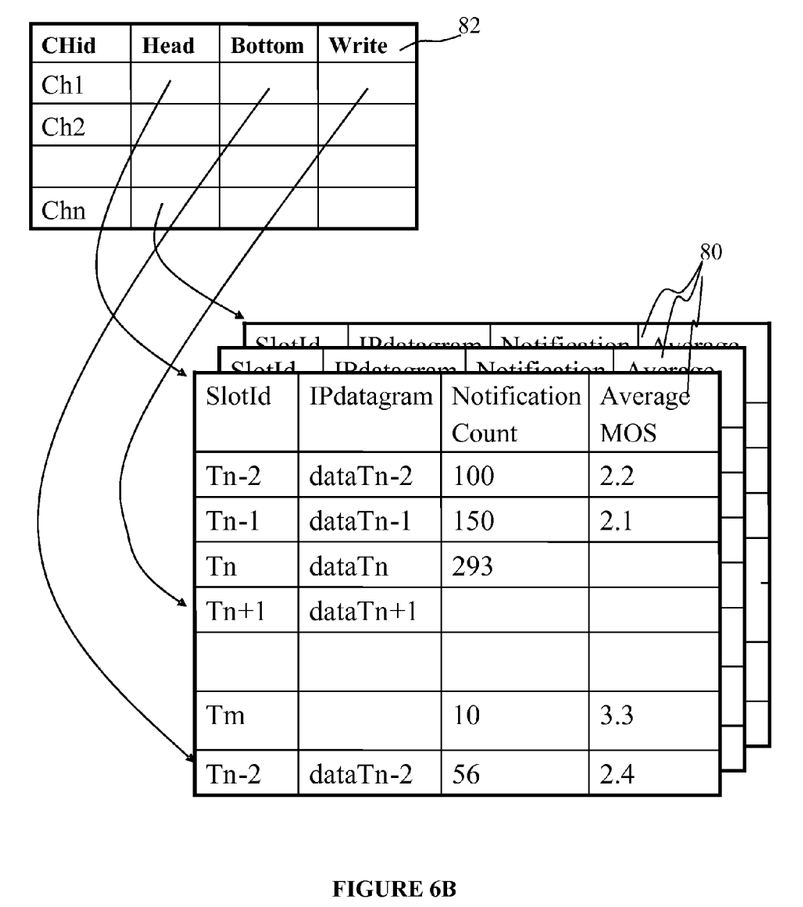
FIG. 6B illustrates an exemplary container table 80, according to the invention.

According to another embodiment of the invention, illustrated in FIG. 6B, the quality manager 8 may comprise a plurality of container tables 80, each maintained for a given channel Ch1, Ch2, . . . , Ch$n$.

According to this embodiment of the invention, there are as many container tables 80 as video channels CH. Container tables are accessed through a channel table 82, in which each row is allocated to a particular video channel Ch1, Ch2, . . . , Ch$n$. Each channel entry in the channel table 82 has three pointers pointing respectively towards the beginning, the end and the current writing position within the associated container table 80. As shown, each container table 80 includes a number of entries each related to a given video container Tn−2, Tn−1, Tn, Tn+1. Each exemplary container table 80 shown in FIG. 6B is a circular table having a size related to the user device size. Each container table 80 represented in FIG. 6B includes 4 columns:

The first column identifies the time slot associated with a video container Ti;

The second column contains the IP datagram included in a video container Ti;

The third column contains the total number of notifications received from the user devices for the same video container Ti. This number may be updated each time a new notification is received for Ti; and The fourth column includes the average quality indicator value, such as the Average MOS. This average value may be updated each time a new notification is received, including a quality indicator value, from a user device for a video container Ti.

The quality manager may select the video containers to be retransmitted based on predefined rules related to parameters of the third and/or fourth columns (total number of notifications, average quality indicator).

Figure 7:
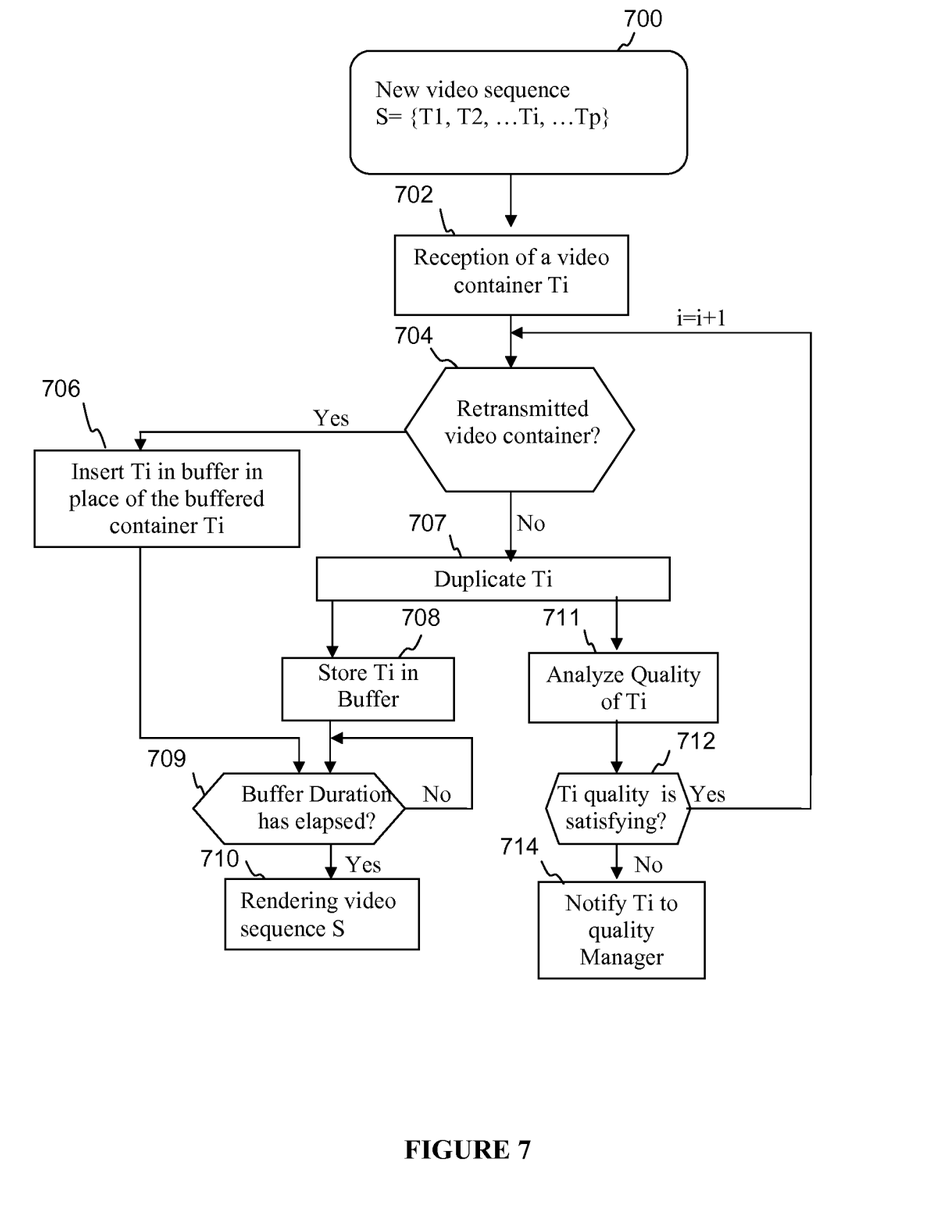
FIG. 7 is a flowchart showing the steps performed to detect corrupted video containers.

FIG. 7 is a flowchart illustrating the steps performed by a user device 3 to detect corrupted video container.

At step 700, the user device 3 starts to receive a new video sequence S in the form of time-sliced video containers T1, T2, . . . Ti . . . Tp.

At step 702, the user device receives a given video container Ti. At step 704, the user device 3 then checks if the video container Ti is a retransmitted video container, for example by checking whether buffer 320 already contains the video container Ti. This occurs in a situation where video container Ti was previously identified as corrupted, resulting in a notification being sent to the quality manager 8 for Ti, and in a subsequent selection of for retransmission by the quality manager 8. The user device 3 then accordingly replaces the buffered video container with the newly received video container Ti at step 706. No subsequent quality evaluation is performed and the video container Ti is inserted as is.

If the video container Ti is a retransmitted video container, the user device 3 duplicates at step 707 the video container Ti. Then, the user device 3 pushes on the one hand the video container Ti in buffer 320, and on the other hand processes the copy of the video container Ti to analyze its quality at step 711. Step 711 may include a prior step of decoding the video container and applying an error correction algorithm such as the Reed Salomon code. Then a quality indicator may be computed for the video container, and in particular an indicator related to the quality as perceived by the user, such as a MOS (Mean Opinion Score) or QoE (Quality of Experience) parameter.

At step 712, the user device then determines whether the quality level of the video container is satisfying, which may include for instance determining whether the quality indicator is lower than a predefined quality threshold. If so, the user device 3 waits for the next video container Ti+1 to be received and repeats steps 704 to 713 for the next video container Ti+1.

If it is determined at step 712 that the quality of the video container is not satisfying (e.g., the quality indicator is lower than the quality threshold), then the user device 3 sends information related to the video container Ti for requesting retransmission, at step 714, and repeats steps 704 to 714 for the next video container Ti+1.

At the buffer level, when the buffering duration elapses, the user device 3 retrieves the buffered video containers out of order from buffer 320 and transmits them to the rendering unit 36 (e.g., a video player), which in turn will render the video sequence S={T1, T2, . . . Ti, . . . Tp}, whether or not all video containers for which retransmission were requested have been received.

Figure 8:
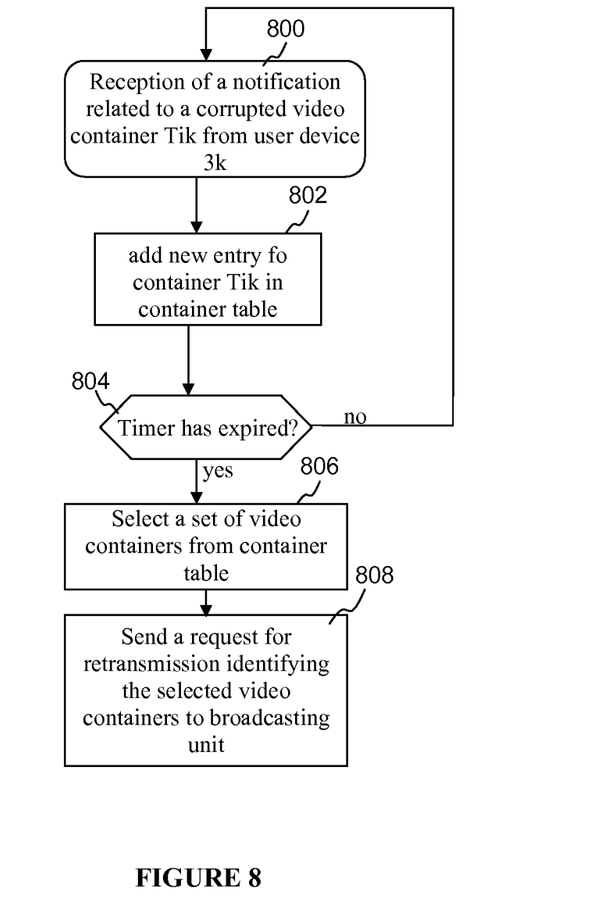
FIG. 8 is a flowchart showing the steps performed to select a set of corrupted video containers for retransmission.

FIG. 8 is a flowchart illustrating the steps performed by the quality manager 8. FIG. 8 is described with reference to the container table structure illustrated in FIG. 6B.

At step 800, the quality manager 8 receives a notification related to a video container Tik from a user device 3k. The user device 3k has sent this notification due to the detection of a poor quality level for video container Tik, as described with reference to FIG. 7. The notification contains information related to the video container Tik, such as the quality indicator Q, the channel identifier CH identifying the transmission channel of the user device and the sequence number S identifying the video container At step 802, the quality manager 8 increments the notification count to update the field representing the total number of notifications (third column of the container table) for the entry related to video container Tik in the container table 80 associated with the channel CH. It also updates the average quality indicator for the video container Tik in the container table 80 based on the quality indicator value Q (fourth column of the container table).

At step 804, the quality manager 8 checks whether the timer 83 has expired. If not, the quality manager 8 repeats steps 800 and 802 for the other notifications received by the user devices. Step 804 may be performed periodically until expiry of the timer 83.

At step 808, the quality manager 8 then sends a request for retransmission identifying the set of selected video containers to the broadcasting unit 2.

If it is determined at step 804 that the timer has expired, the quality manager 8 selects, at step 806, a set of video containers from container table 80 based on predefined rules as candidates for retransmission.

Figure 9:
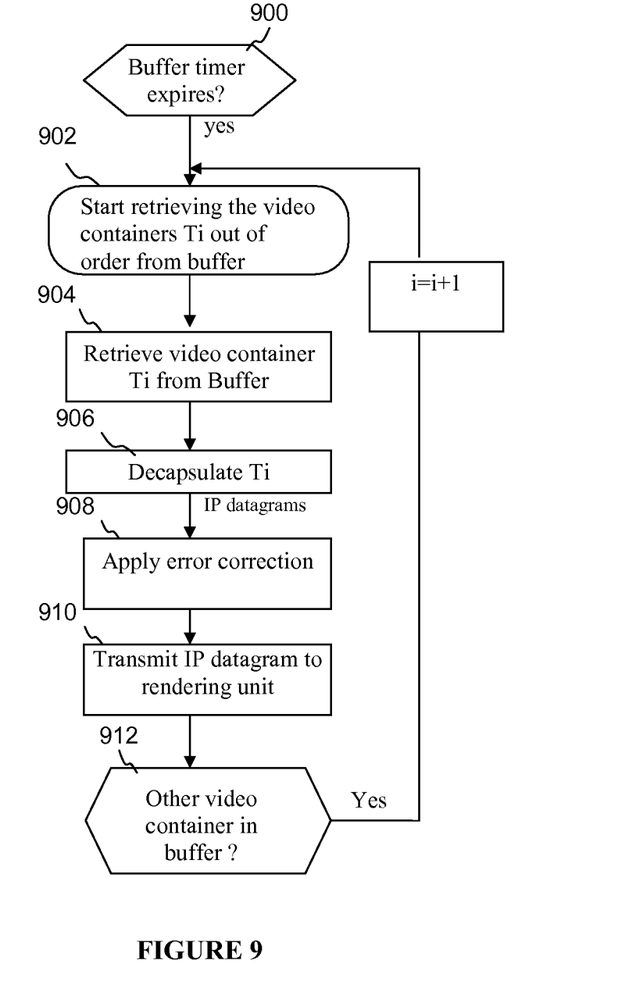
FIG. 9 is a flowchart showing the steps performed to render the received video containers.

FIG. 9 illustrates the steps performed to render a video sequence S={T1, T2, . . . Ti, . . . Tp}.

At step 900, the user device checks whether the buffer timer has expired. If so, the user device 3 starts retrieving the video containers Ti out of order from buffer 320, at step 902. More specifically, the user device 3 retrieves each video container Ti according to the buffering order at step 904.

Then, at step 906, the user device 3 decapsulates the video container Ti to reform section by decoding Ti inbound information into multiprotocol encapsulation forward error correction (MPE-FEC) sections along with erasure information, and parsing through the MPE-FEC sections to extract the IP datagrams.

At step 908, the user device 3 may apply error correction to the MPE sections. Step 908 may include applying the Reed-Solomon code resulting in corrected IP datagrams, to correct errors that occurred during transmission or storage for specific reasons (for example noise or interference, scratches on a CD, etc). The rendering unit 38, e.g., a player, then processes the corrected IP datagrams, at step 910.

At step 912, the user device 3 checks whether the buffer 320 contains other video containers, and if so repeats steps 904 to 912 for the next video container Ti+1.

Figure 10:
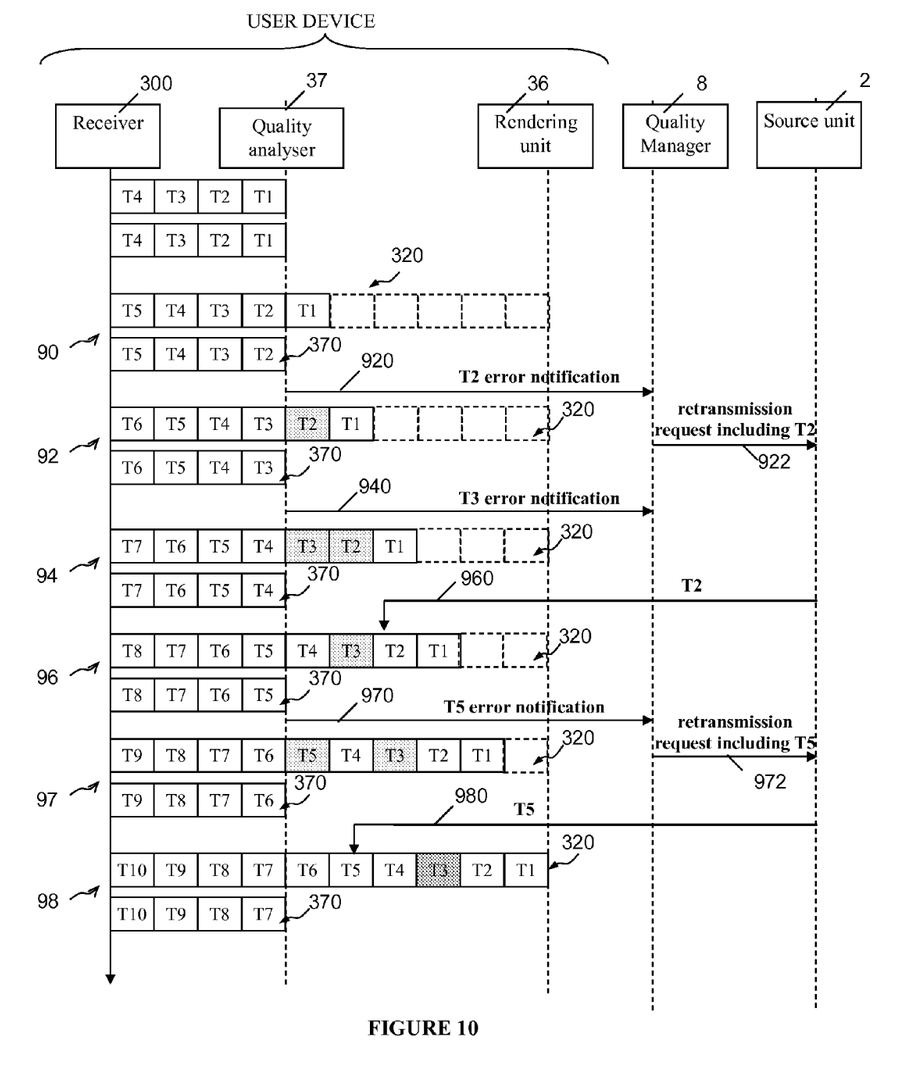
FIG. 10 is a diagram illustrating the reception of video containers.

FIG. 10 shows the data exchanged in system 10 for an exemplary video sequence, according to the invention. The representation of FIG. 10 includes functional blocks between which data are exchanged. The skilled person will understand that the representation of FIG. 10 is for explanatory purpose, and should not be considered as limiting.

More specifically, FIG. 10 shows different states of a quality analyzer buffer 370 in a vertical axis, between the receiver block 300 and the quality analyzer 37. The quality analyzer buffer 370 represents the state of the video containers that are waiting to be processed at the quality analyzer 37. For example, at 90, the quality analyzer buffer contains data blocks T2, T3, T4, T5 that are to be processed.

There is also shown in the vertical axis the processing state of buffer 320 above the quality analyzer buffer 370, at the different phases 90, 92, 94, 96 and 98. Schematically, buffer 320 extends up to the rendering unit 36.

Accordingly, at each phase 90 to 98, there is shown the processing state of the video containers at buffer 320 and at the same time the corresponding state of the data blocks at the quality analyzer 37.

At step 90, video container T1 is pushed in 320. At the same time T1 is analyzed for human perception quality by the quality analyzer 37 and the quality is found acceptable.

At step 92, video container T2 is pushed in buffer 320. At the same time T2 is analyzed for human perception quality and the quality is found unacceptable. Analyzer 37 sends information related to the corrupted video container T2 to the quality manager 8.

At step 922, the quality manager selects a set of video containers from the container table, including container T2, and sends a request to the broadcasting unit 2 to request the retransmission of the selected video containers.

At step 94, video container T3 is pushed in buffer 320. At the same time T3 is analyzed for human perception quality by the quality analyzer 37 and the quality is found unacceptable. Analyzer 37 sends information related to the corrupted video container T3 to the quality manager 8.

At step 96, video container T4 is pushed in buffer 320. At the same time T4 is analyzed for human perception quality by the quality manager 37 and the quality is found acceptable. At the same time slot, the video container T2 for which a retransmission request was sent at step 922 is received and inserted in place of the corrupted video container T2 in the buffer 320.

At step 97, video container T5 is pushed in buffer 320. At the same time, T5 is analyzed for human perception quality by the quality analyzer 37 and the quality is found unacceptable. Analyzer 37 sends information related to the corrupted video container T5 to the quality manager 8.

At step 972, the quality manager selects a set of video containers from the container table including container T5 and sends a request to the broadcasting unit 2 to request the retransmission of the selected video containers.

At step 98, video container T6 is pushed in buffer 320. At the same time, T6 is analyzed for human perception quality by the quality manager 37 and the quality is found acceptable. At the same time slot, the video container T5 for which a retransmission request was sent at step 972 is received and inserted in place of the corrupted video container T5 in the buffer 320.

At expiry of the buffering duration, the video containers T1 to T6 are retrieved from buffer 320 out of order and transmitted to the rendering unit 36 which renders the video sequence.

In the above example, only the video container T3 has not been resent by the broadcasting unit 2, due to the quality manager 8 not selecting this video container as candidate for retransmission. However, since the corrupted video container T3 originally received at 94 was stored in buffer 320, the operation of the rendering unit 36 is not delayed.

With the invention, the end users can receive digital content on their user equipment with an improved quality, in a seamless manner.

The detection of corrupted video containers and the retransmission of selected video containers occur within the buffering duration. Accordingly, the invention does not generate further delay and the end users can receive the video sequence with a satisfying level of quality and in a transparent manner.

According to the invention, it is also possible to manage the retransmission of corrupted video containers based on broadcasting conditions, such as the total number of notifications received by the quality manager, the quality indicator average for each video container for which notifications have been received by the quality manager, priority information, etc.

Further, if the quality manager 8 decides not to select corrupted data as candidate for retransmission based on predefined rules or if it only selects the corrupted data subsequently after a time period lapses, the rendering unit operation will not be delayed.

The invention can further take the form of an entirely hardware embodiment, an entirely software embodiment or an embodiment containing both hardware and software elements implementing the system and the method according to the invention.

The invention can also take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, the skilled person will understand that the structure of the container table is for exemplary purposes only, and that other structures could be used alternatively, with additional parameters. The person skilled in the art will also recognize that the invention is not limited to a unique streaming server 20 but may alternatively include a plurality of streaming servers.

The invention claimed is:

1. A method for receiving digital transmissions in a user device in bursts from a source unit, the method comprising:
   a) receiving bursts from the source unit; and
   b) rendering the digital transmission based on the received bursts;
   wherein step a) comprises, for each received burst:
      a1) duplicating the received burst to provide a duplicated burst, and buffering the received burst for a predefined buffer duration, and within the buffering duration:
         i) evaluating a quality indicator related to the quality of the received burst by evaluating the duplicated burst;
         ii) checking whether the quality indicator matches a quality condition related to a predefined quality threshold; and
         iii) in response to the quality indicator not matching the quality condition indicating the received burst as a corrupted burst and sending the corrupted burst for each received burst not matching the quality condition to a quality manager,
         iv) storing a plurality of corrupted bursts in a container table, v) in response to a triggering event, sending a retransmission request for at least one corrupted burst from the container table to retransmit the received burst corresponding to the at least one corrupted burst to the source unit for requesting retransmission of the received burst to the user device.

2. The method of claim 1, wherein step a) comprises prior steps of:
checking whether the received burst is already buffered;
if the received burst is not already buffered, performing step a1);
if the received burst is already buffered, buffering the received burst in place of the corresponding buffered burst.

3. The method of claim 1, wherein step b) further comprises a step of decoding the bursts prior to rendering.

4. The method of claim 3, wherein step b) further comprises a step of applying an error correction algorithm to each decoded burst.

5. The method of claim 1, wherein step i) further comprises a prior step of decoding the burst.

6. The method of claim 5, wherein step i) further comprises a step of applying an error correction algorithm to each decoded burst prior to evaluating the quality indicator.

7. The method of claim 1, wherein step a) further comprises a step of decoding the received burst prior to step a1).

8. The method of claim 7, wherein step a) further comprises a step of applying an error correction algorithm to each decoded burst.

9. The method of claim 1, wherein the digital transmission is of a DVB-H (Digital Video Broadcast-Handheld) type.

10. The method of claim 8, wherein each burst comprises a MPE-FEC frame (Multiprotocol Encapsulation—Forward Error Correction).

11. The method claim 1, wherein the user device is of a mobile phone type and the step of sending a retransmission request is performed through radio communication.

12. The method of claim 11, wherein the radio communication is of a GPRS (General Packet Radio Service) or UMTS (Universal Mobile Telecommunications System) type.

13. The method of claim 1, wherein the quality indicator is a parameter related to subjective quality as perceived by the user of the user device.

14. The method of claim 13, wherein the quality indicator is a Mean Opinion Score (MOS) parameter.

15. The method of claim 14, wherein the Mean Opinion Score parameter is of a Quality of Experience (QoE) type.

16. The method of claim 1, wherein the retransmission request comprises a channel identifier identifying a channel through which the burst was received.

17. The method of claim 1, wherein the retransmission request comprises the quality indicator evaluated for the burst.

18. The method of claim 1, wherein the retransmission request comprises a sequence number identifying the burst.

19. A user device connected to a source unit through a communication network for receiving digital transmissions in bursts from a source unit, the user device comprising:
a receiver for receiving bursts from the source unit;
a rendering unit for rendering the digital broadcast transmission based on the received bursts;
wherein the receiver comprises:
a duplicator for duplicating each received burst to provide a duplicated burst;
a buffer for buffering for each received burst for a predefined buffer duration, the user device being provided to transmit the buffered bursts to the rendering unit in response to expiry of the predefined buffer duration; and
a quality analyzer for evaluating a quality indicator related to a quality of each received burst by evaluating the corresponding duplicated burst, checking whether the quality indicator matches a quality condition related to a predefined quality threshold, and in response to the quality indicator not matching the quality condition indicating the received burst as a corrupted burst and sending the corrupted burst for each received burst not matching the quality condition to a quality manager, the quality analyzer being arranged to operate within the predefined buffer duration;
a quality manager for storing a plurality of corrupted bursts in a container table, in response to a triggering event, sending a retransmission request for at least one corrupted burst from the container table to retransmit the received burst corresponding to the at least one corrupted burst to the source unit for requesting retransmission of the received burst to the user device.

20. The user device according to claim 19, further comprising:
a controller for determining whether a received burst is already stored in the buffer and if so for storing the buffered burst in place of a corresponding buffered burst in the buffer.

21. The user device of claim 19, wherein the digital transmission is of a DVB-H (Digital Video Broadcast-Handheld) type.

22. The user device of claim 21, wherein each burst includes a MPE-FEC frame (Multiprotocol Encapsulation—Forward Error Correction).

23. The user device of claim 21, wherein the user device is a mobile phone and comprises radio communication unit for requesting retransmission of bursts.

24. The user device of claim 23, wherein the radio communication unit is of a GPRS (General Packet Radio Service) or UMTS (Universal Mobile Telecommunications System) type.

25. A system for delivering digital content, comprising:
a source unit;
a communication network; and
at least one user device, connected to the source unit through the communication network, for receiving digital transmissions in bursts from the source unit, each user device comprising:
a receiver for receiving bursts from the source unit;
a rendering unit for rendering the digital broadcast transmission based on the received bursts;
wherein the receiver comprises:
a duplicator for duplicating each received burst to provide a duplicated burst;
a buffer for buffering for each received burst for a predefined buffer duration, the user device being provided to transmit the buffered bursts to the rendering unit in response to expiry of the predefined buffer duration; and
a quality analyzer for evaluating a quality indicator related to a quality of each received burst by evaluating the corresponding duplicated burst, checking whether the quality indicator matches a quality condition related to a predefined quality threshold, and in response to the quality indicator not matching the quality condition indicating the received burst as a corrupted burst and sending the corrupted burst for each received burst not matching the quality condition to a quality manager, the quality analyzer being arranged to operate within the predefined buffer duration;

a quality manager for storing a plurality of corrupted bursts in a container table, in response to a triggering event, sending a retransmission request for at least one corrupted burst from the container table to retransmit the received burst corresponding to the at least one corrupted burst to the source unit for requesting retransmission of the received burst to the user device.

\* \* \* \* \*